United States Patent [19]

Rose et al.

[11] 4,456,822

[45] Jun. 26, 1984

[54] SELF-CONTAINED MULTI-MODE VIBRATORY FEEDER CONTROL WITH UNITARY DELAY ADJUSTMENT

[75] Inventors: Robert F. Rose; Lonnie W. Manning, both of Rockford, Ill.

[73] Assignee: Dixon Automatic Tool, Inc., Rockford, Ill.

[21] Appl. No.: 322,281

[22] Filed: Nov. 17, 1981

[51] Int. Cl.³ .............................................. G01V 9/04
[52] U.S. Cl. .................... 250/223 R; 198/751
[58] Field of Search ................ 318/480, 484–487; 198/751, 391, 524, 502, 572, 857; 250/223 R, 223 B, 227; 307/590, 592, 595, 597, 599, 601

[56] References Cited

U.S. PATENT DOCUMENTS

| | | | |
|---|---|---|---|
| 3,898,516 | 8/1975 | Nakasone | 315/194 |
| 4,050,572 | 9/1977 | Armstrong | 198/751 |
| 4,097,791 | 6/1978 | Bivens et al. | 318/484 |
| 4,278,881 | 7/1981 | Mann | 250/227 |
| 4,320,316 | 3/1982 | Horii et al. | 307/595 |

OTHER PUBLICATIONS

Product Design & Dev., Jul. 1980, p. 39 (mini power control).
New Equipment Digest, Feb. 1980, (Rodix sales literature).
Rodix Bulletin FC-3, Solid State Feeder Controls, 1980.
General Electronic, SCR Manual, 1967, p. 189, Fig. 9.15.
EDR Electronics, PR151 Photo Proximity Control, Pub. 131, Aug. 1980.
Fairchild, Linear IC Data Catalog 1971, 114–117.
RCA, Transistor Thyristor & Diode Manual, 1971, 210–225.
RCA Integrated Circuits, 1976, 42–45, 161–165, 356.
GE, Transistor Manual, 1964, 321–325.
Turner, FET Circuits, 1968, 98–101.

Primary Examiner—David C. Nelms
Attorney, Agent, or Firm—Leydig, Voit, Osann, Mayer & Holt, Ltd.

[57] ABSTRACT

A vibratory power control having all of the electronics for feedback control of a vibratory parts feeder in a single unit with a fiber-optic cable for remote sensing of parts feeding and a single control adjusting both on delay and off delay of the feeder. A mode switch for selecting on delay, off delay, or dual delay; a sensor polarity switch, and a wired-OR sensor input are provided so that the improved electromagnetic noise immunity of the self-contained design is obtained with a coincident increase rather than decrease in system flexibility.

15 Claims, 10 Drawing Figures

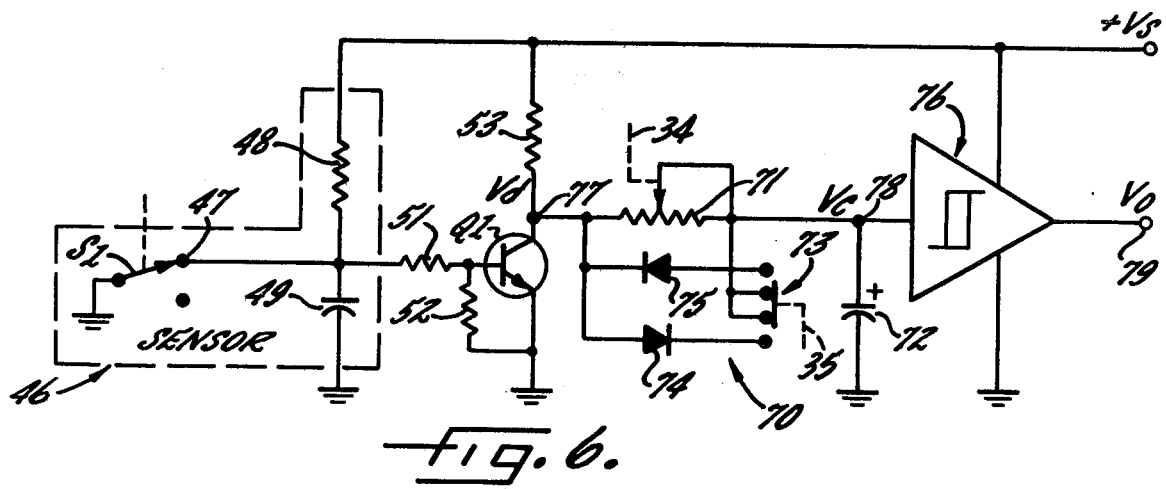
fig. 6.
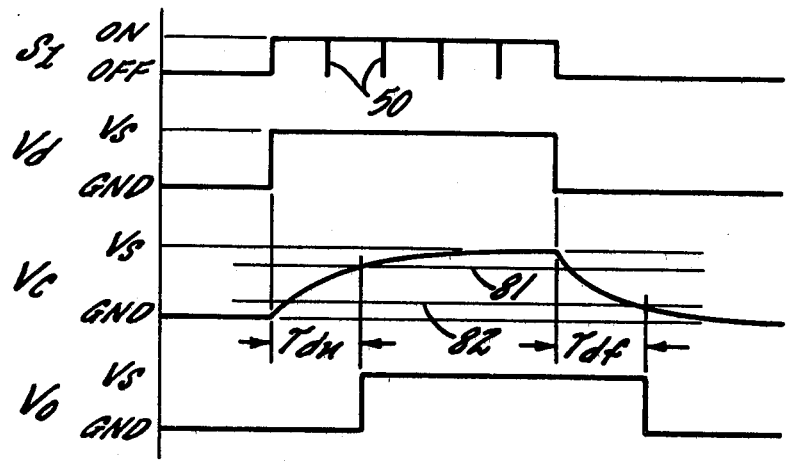
fig. 7.
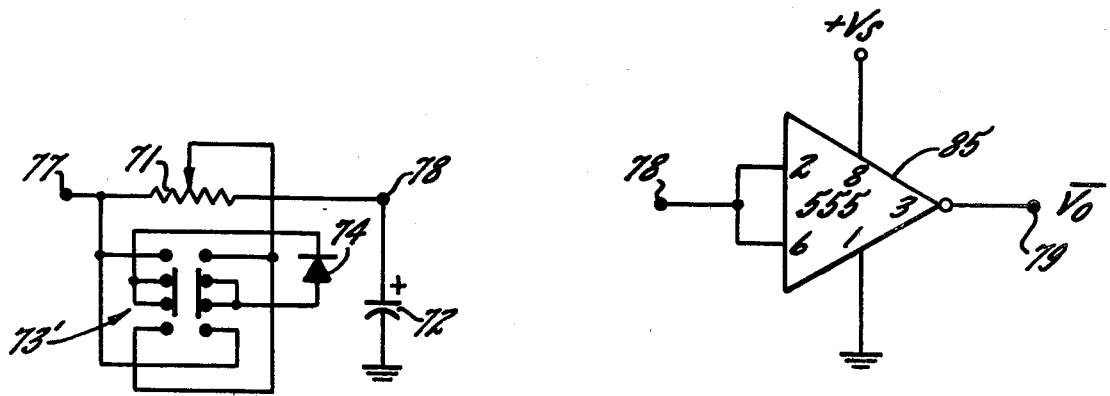
fig. 8a.
fig. 8b.

SELF-CONTAINED MULTI-MODE VIBRATORY FEEDER CONTROL WITH UNITARY DELAY ADJUSTMENT

TECHNICAL FIELD

This invention relates generally to controls for vibratory feeders and more particularly concerns such controls which include a low turn-off capability activated by a sensor detecting a parts backlog and signaling the need to stop the feeding of parts.

BACKGROUND ART

Vibratory feeders for small parts such as screws, nuts, plastic pieces and so on are generally AC powered and electromechanically tuned to either a 60 or 120 cycle per second frequency. For bowl-type feeders, a bowl for the parts which includes a spirally ascending track interiorally about its circumference is mounted on an intermediate portion which rests on a base. The intermediate portion is coupled to an AC power source through a power control and is electromagnetically tuned to vibrate the bowl. Vibration of the bowl causes the parts to move upwardly along the spiral track.

These parts then move to a machine feed track where they are temporarily stored for feeding into an assembly machine. Since the assembly machine is usually part of an assembly line, it is desirable to have the assembly machine operating at a constant rate not constrained by the rate at which parts may be fed. Thus the vibratory feeder is controlled to feed parts at a faster rate than that which the parts are accepted by the assembly machine. A sensor detecting a parts backlog shuts off the vibratory feeder when a sufficient number of parts are fed to the machine feed track.

Since the combination of the vibratory feeder, machine feed track, and parts backlog detecting sensor constitutes a simple feedback loop, it is desirable to introduce a delay so that the vibratory feeder is turned on and off at a rather slow rate rather than at a high rate which would occur with a very short delay. For this purpose the prior art systems have used a separate sensor switch, delay circuits, and power control circuits, which are connected by signal cables. The delay circuits present either an on delay time between the instant that the sensor switch indicates the absence of a backlog and the power control circuit turns on the vibratory feeder, or an off delay between the time that a parts backlog is detected and the vibratory feeder control shuts off the vibratory feeder. Alternatively, the on delay circuit and the off delay circuit may be cascaded to form a dual delay circuit in which there are both on delays and off delays.

Prior art dual delay controllers have used individual potentiometers to set the on delay and the off delay. This is true even though it is advantageous to have the on delay and the off delay time generally equal. In practice it is found that it is troublesome to have to adjust both of the potentiometers to approximately the same delay.

There is also a problem with the prior art in that the signal cables connecting the sensor switch, delay circuits, and power control circuits are suceptible to the pick-up of electromagnetic noise such as occur in an industrial environment.

DISCLOSURE OF INVENTION

The overall aim of the invention is to provide a self-contained vibratory feeder power control which includes sensor circuits, delay circuits, and power control circuits, all in a single unit, and which still provides the flexibility in mode functions that would be attainable by connecting individual functional circuits.

It is also an object of the invention to provide a single potentiometer control to select the delay time for an on delay and off delay in a dual delay mode having approximately equal on delay and off delay times.

A further objective is to eliminate electromagnetic noise pick-up on the signal connections between the sensor electronics, the delay circuits, and the power control circuits.

Yet another objective is to eliminate the need for separate enclosures for the sensor electronics and the power control electronics.

Still another objective of the invention to permit selectable polarity of the sensor switch for activation of a vibratory parts feeder upon either the presence or absence of a parts backlog in the machine feed track.

Moreover, it is an object of the invention to provide a plurality of selectable time delay modes including an on delay mode, an off delay mode, and a dual delay mode.

BRIEF DESCRIPTION OF THE DRAWINGS

Other objects and advantages of the invention will become apparent upon reading the following detailed description and upon reference to the drawings in which:

FIG. 6 is a simplified schematic of the delay circuit according to the preferred embodiment of the present invention;

FIG. 7 is a timing diagram corresponding to the schematic in FIG. 6;

FIG. 8a depicts an alternate method of wiring a mode switch so that a single directional diode is used;

FIG. 8b is a wiring diagram for using a type 555 timer integrated circuit for the Schmitt trigger shown in FIG. 6.

Figure 1:
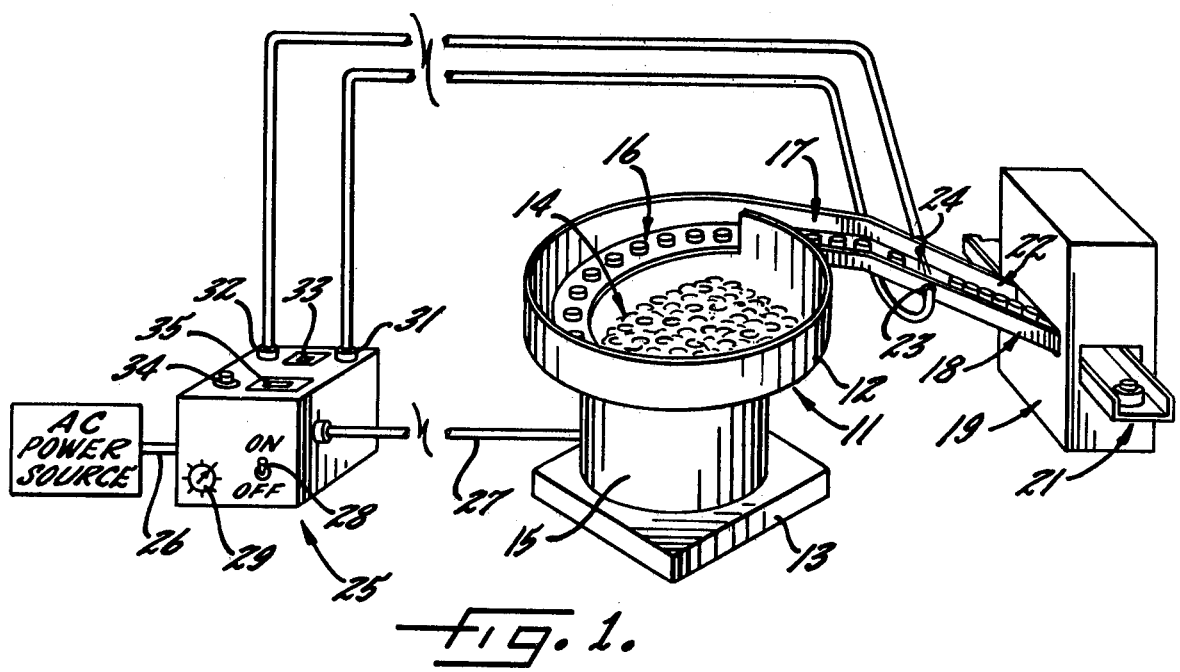
FIG. 1 is a diagrammatic illustration of a vibratory feeder and control arrangement.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

BEST MODE FOR CARRYING OUT THE INVENTION

In FIG. 1 a vibratory feeder generally designated 11 has a parts bearing bowl 12, an intermediate bowl-vibrating portion 15, and a base 13. Vibration of the bowl 12 moves the parts generally designated 14 along an interior circumferential track generally designated 16 and out of the bowl 12 onto a straight feeder track generally designated 17. The parts move along the track 17 to a machine feed track generally designated 18 feeding an assembly machine generally designated 19 on an assembly line generally designated 21. As shown, the machine feed track 18 gravity feeds the parts 14 to the assembly machine 19 and there is a temporary storage of parts generally designated 22 for insuring that the assembly machine 19 always has a ready supply of parts. Sometimes a separate vibrator (not shown) rather than gravity powers the machine feed track. The feed rate of the parts 14 out of the bowl 12 must be set at some fraction above the machine cycle rate at which the parts 14 are fed into the machine 19 so that there is always a temporary supply of parts 22. Although the vibratory feeder 11 could be set for a continuous operation, this would cause the parts 14 to build up so that some would fall off the circular track 16 back into the feeder bowl 12. This could cause damage to the parts 14 especially in the case of polished parts and for precision parts, for example, those used in medical instruments. In addition to parts damage, continuous operation of the vibratory feeder 11 wastes power.

Thus, it is well known to use a parts detection sensor to determine if the parts 14 have piled up on the linear machine feed track. A feedback control then is used to shut off the vibratory feeder when the parts pile up. It is not desirable, however, to shut the feeder 11 on and off at a rate equal to the passage of individual parts, so that a delay in the feedback loop is added. This delay may be an "on delay" in which the vibratory feeder 11 is turned on at some predetermined time after the parts detection sensor senses the absence of a pile up of parts 14 on the machine feed track, or it may be an "off delay" in which the absence of a pile-up of parts 14 immediately turns on the vibratory feeder 11, but the vibratory feeder 11 continues to stay on after a pile-up is detected for a pre-determined delay. A third possibility is a dual delay method in which the vibratory feeder 11 is turned on and off sometime after the detection of the pile-up of parts 14 or the absence of pile-up of parts 14 on the machine feed track 18.

To detect this pile-up or backlog of parts 14, in carrying out the invention, a fiber optic cable 23 is used to detect when the temporary storage of parts 22 fills up to form a pile-up or backlog of parts and to provide a sensor signal. A receiving fiber optic cable 23 senses light emitted by a transmitting fiber optic cable 24 positioned on the opposing side of the machine feed track 18. Thus a pile-up of parts 14 blocks the passage of light from the transmitting cable 24 to the receiving cable 23 thereby giving an indication of the presence or absence of a parts backlog on the machine feed track 18.

The fiber optic cables are connected to transmit the sensor signal to machine power control means herein shown, as a self-contained multi-mode vibratory feeder control generally designated 25 which is constructed in accordance with the invention. The feeder control 25 receives electrical power from an AC power source via an electrical cable 26 and controls the AC power fed to the machine through vibratory feeder power input line 27 that is connected to an exciting electromagnet (not shown) inside the intermediate bowl vibrating portion 15 of the vibratory feeder 11. The vibratory feeder control 25 has an on-off switch 28 to completely disconnect the AC power source from the vibratory feeder 15 and also has a power control knob 29 for adjusting the level of power coupled to the feeder 11. Moreover, the fiber optic cables 23, 24 are connected via fiber optic couplers 31, 32 to circuits inside the feeder control 25 which generate a transmitting light signal on the cable 24 and which detect the presence or absence of light received on the light receiving fiber optic cable 23. The vibratory feeder power control 25 has a polarity selecting switch 33 to determine whether the vibratory feeder 11 is activated upon the presence or the absence of a parts backlog on the machine feed track 18. A single potentiometer adjusting shaft 34 and a delay mode selecting switch 35 are also provided on the power control 25 for selecting the duration of the delay and also either the on delay, off delay, or dual delay modes.

Figure 2:
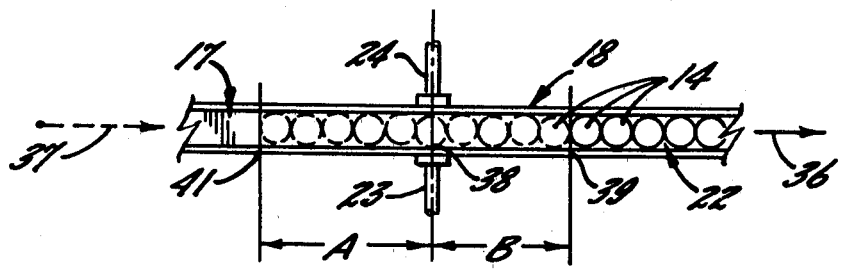
FIG. 2, labelled prior art, is a detailed illustration of the machine feed track in the vicinity of the parts backlog detecting sensor.

In FIG. 2, labeled Prior Art, the machine feed track 18 is shown in greater detail. On the right, the parts 22 that are temporarily stored exit to the assembly machine 19 at a generally constant machine cycle rate represented as a velocity vector 36, while on the left the parts 14 enter the machine feed track with a higher but intermittent velocity represented by the dashed vector 37. The leftmost extent of the temporarily stored parts 22 oscillates between the minimum position 39 and the maximum position 41 that are in practice found to the right and left of, respectively, the axis 38 of the parts detecting light beam from the light sending fiber optic cable 24. The distances between these three points 41, 38, and 39 define two deviation distances A and B shown in FIG. 2.

Experimentally the setting of the on delay and the off delay in a dual delay timing mode may be observed by watching the pile-up of parts 14 on the linear machine feed track 18 with respect to the location 38 of the parts detecting beam. The point at which the temporary storage of parts 22 terminates, shown in FIG. 2 as the point where the parts 14 change from an intermittent dashed representation to a solid line representation, oscillates to the right and left on the machine feed track about the axis 38 of the parts detection beam. The amplitude of oscillation A+B is related to the frequency of oscillation by approximately the difference between the feeder bowl feed rate 37 and the machine cycle rate 36. The amplitude B in distance from the axis of the parts detection sensing beam 38 to the minimum point 39 in the direction of the machine 19 is proportional to the on delay time. The amplitude A in terms of the distance from the axis of the parts detection sensing beam 38 towards the feeder bowl 12 is proportional to the off delay time. It is preferable in practice to have the on delay time and the off delay times generally equal in the dual delay mode.

Figure 3:
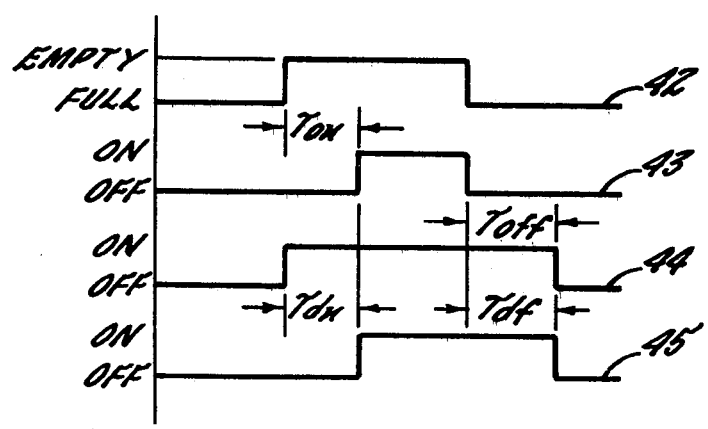
FIG. 3, labeled Prior Art, is a timing diagram illustrating the parts backlog detecting sensor logic state and the vibratory feeder logic state for the on delay, off delay, and dual delay control modes.
Figure 4:
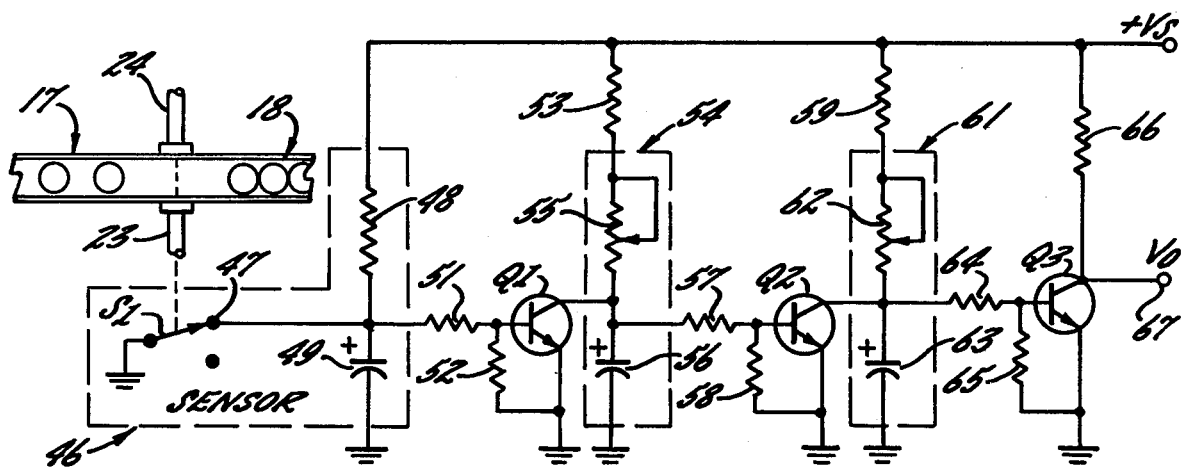
FIG. 4, labeled Prior Art, is an electrical schematic drawing of a prior art circuit employing separate potentiometers to adjust the on delay and off delay times.
Figure 5:
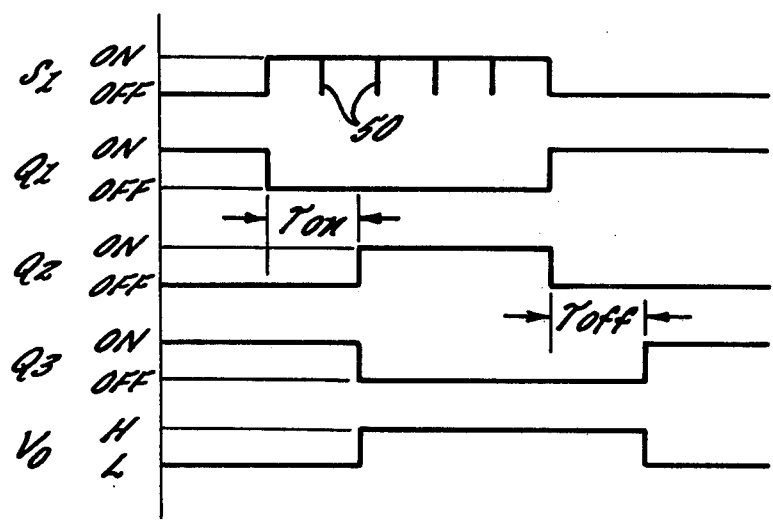
FIG. 5, labeled Prior Art, is a timing diagram corresponding to the schematic in FIG. 4.

As shown in FIG. 3, labeled Prior Art, the parts backlog detecting circuits generate a logic signal 42 indicating whether the linear machine feed track is full or partially empty. Delay circuits convert the logic signal 42 to a vibratory control signal either 43, 44, or 45 depending on whether the on delay, off delay, or dual delay mode, respectively, is selected. The on delay time Ton is the delay time from the rising edge of the detector signal 42 and the rising edge of the vibrator control signal 43. The off delay mode 44 has an off delay Toff from the falling edge of the detection signal 42 and the falling edge of the vibrator control signal 44. And finally, the dual delay mode has both an on delay Tdn and an off delay Tdf similarly obtained as in the case of the on delay control signal 43 and the off delay control signal 44. It is evident from FIG. 3 that the dual delay control signal 45 may be obtained by cascading the circuits generating the on delay control signal 43 and the circuit generating the off delay control signal 44. This is illustrated in the detailed schematic of FIG. 4, labeled Prior Art, and its corresponding timing diagram in FIG. 5, also labeled Prior Art. The parts detecting sensor circuits generally designated 46 have a switching means S1 having an active node 47 that is either open or to ground, depending on whether a part 14 blocks the transmission of light from the light transmitting fiber optic cable 24 to the light receiving fiber optic cable 23. As shown in FIG. 5, the logic signal for S1 has sporadic glitches 50 caused by the intermittent passage of parts 14 across the light transmission path which are not indicative of the pile-up of parts. To remove these glitches 50 a sensor turn-off delay resistor 48 and a sensor turn-off delay capacitor 49 are used so that the sensor 46 will not respond to the glitches 50. The sensor switch terminal 47 is then connected to a first RTL inverter comprising a transistor Q1, series resistor 51, threshold raising resistor 52, and load resistor 53. A turn-on delay network generally designated 54 is added to the output of the transistor Q1 and includes a turn on delay adjusting potentiometer 55 and turn on delay capacitor 56. A second RTL inverter stage comprising transistor Q2, series resistor 57, logic threshold raising resistor 58, and load resistor 59 has a similar turn-off delay network generally designated 61 comprising a turn-off delay adjusting potentiometer 62 and turn off delay capacitor 63. The vibratory control signal Vo is obtained on an output node 67 of a third RTL inverter stage comprising transistor Q3, series resistor 64, logic threshold raising resistor 65 and a load resistor 66. Thus the prior art circuit in FIG. 4 has two independent potentiometers 55, 62 that are needed to adjust the on delay and the off delay.

In accordance with this invention, a single potentiometer is employed to adjust generally equal on delays and off delays, as part of a single control unit that contains sensor electronics, delay circuits, and power control circuits. Moreover, the single potentiometer is capable of adjusting the delay times for the on delay, off delay, or dual delay modes as determined by the position of a three-position switch, which affords the operator great flexibilty and convenience in the chosing of the desired mode of operation according to the particular application of the vibratory feeder to which the control is applied.

A preferred form of digital delay circuit embodying such a single potentiometer is illustrated in FIG. 6. As there shown, the sensor 46 and an RTL inverter driver stage comprising the transistor Q1 and generating a logic signal Vd are the same as in the prior art circuit of FIG. 4. The collector of the transistor Q1 at node 77 is, however, directly connected to the load resistor 53, and thus the signal Vd on the collector node 77 swings from ground to plus supply +Vs as shown in FIG. 7. In other words, the RTL inverter drive stage is a voltage driving means for generating the binary drive voltage Vd in response to the binary sensor signal on the active node 47 of the switch S1. This signal Vd is used to charge and discharge a single charging capacitor 72 through a single potentiometer 71. The potentiometer 71 is a bi-directional variable resistor means, a bi-directional charging means, and a single charging control means for adjusting both the on delay Tdn and off delay Tdf. The capacitor 72 can, however, be quickly charged or quickly discharged by directional diodes 74, 75, respectively, that may be connected across potentiometer 71 by moving the button 35 of a slide switch 73 from its center off position. The slide switch 73 is a three position switch that enables selection of the mode of operation of the control. A single directional diode 74 may be used if a more complex switch 73' is used, as shown in FIG. 8a.

When the dual delay mode is selected by putting the slide 35 in its center position, the capacitor 72 is charged and discharged in exponential fashion as shown in FIG. 7. In other words, the capacitor 72 serves as an integrating means responsive to the binary drive voltage Vd, but the integration function of the capacitor 72 is limited by the finite supply voltage range of ground to +Vs, thus limiting the capacitor voltage Vc to a minimum charge value of ground and a maximum charge value of +Vs.

A Schmitt trigger generally designated 76 selects the charging node 78 of capacitor 72 as its input, and outputs the vibratory control signal Vo on its output node 79. As shown in FIG. 7, the Schmitt trigger compares the voltage Vc on node 78 to either of two predetermined thresholds 81, 82 so that an on delay Tdn and off delay Tdf are present between the time that the drive signal Vd changes logic state and the vibratory control signal Vo changes its logic state. The Schmitt trigger functions generally as a threshold detector means but, instead of having just a single predetermined threshold, also employs hysteresis so that when the spacing between the two thresholds 81 and 82 is a substantial fraction of Vs, the Schmitt trigger sets a maximum limit on the rate of transitions in the output signal Vo, thus rejecting noise from the sensor 46. The Schmitt trigger 76 may be constructed in a number of ways, including a transistor pair with positive feedback, an operational amplifier with positive feedback, and may even be obtained by wiring a single timer integrated circuit 85 part No. 555 as shown in FIG. 8b. The 555 has thresholds 82 and 81 at one-third Vs and two-thirds Vs, respectively, which is a sufficient threshold spacing so that capacitor 49 could be removed completely, with the glitches 50 being rejected as sensor 46 noise.

Figure 9:
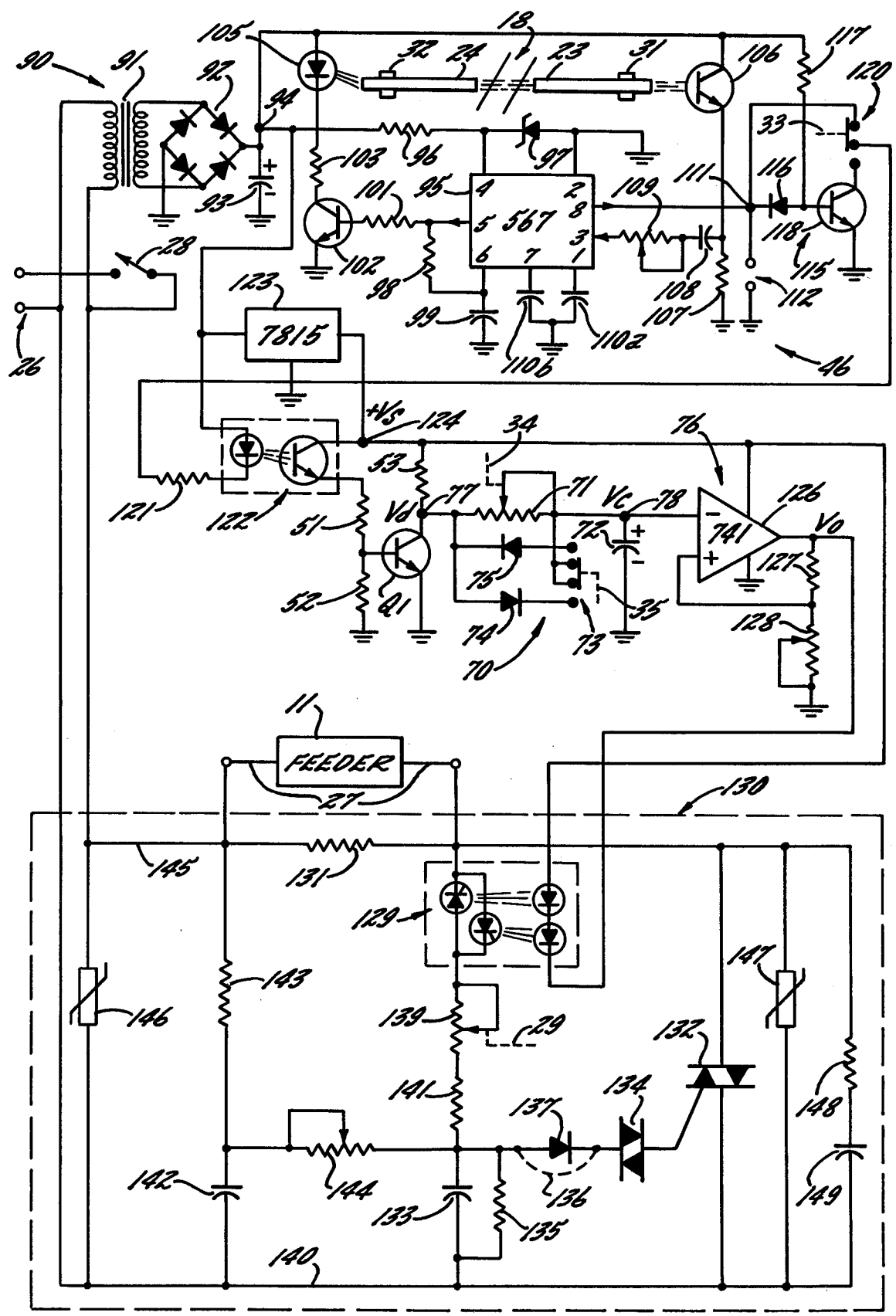
FIG. 9 is a detailed electronic schematic of the preferred embodiment of the invention.

A detailed schematic of the preferred embodiment for the multi-mode vibrator feeder control is shown in FIG. 9. The AC power source is coupled via power lines 26 through the on-off switch 28 to the power control circuits generally designated 130 and also the power supply generally designated 90 of the sensor circuits generally designated 46 and the time delay circuits generally designated 70. The power supply 90 is of conventional designal comprising an 18 volt, 200 milliamp step-down transformer 91, a full wave bridge rectifier 92, and a 1,000 microfarad/35 VDC filter capacitor 93 which presents an unregulated DC output at node 94.

The major component of the sensor circuits 46 is a phase lock loop tone decoder part no. 567 which receives its supply power from a series resistor 96 connected to pin 4 of the tone decoder chip 95. Pin 4 is also shunted to ground through an 8.3 volt zener diode 97 to provide supply regulation. The substrate of the integrated circuit 95 on pin 2 is also grounded. The tone decoder chip 95 generates square wave output on pin 5 with a frequency determined by a frequency setting resistor 98 and frequency setting capacitor 99 that are connected to pin 6. The square wave output on pin 5 is fed through a series resistor 101 to a switching transistor 102 which through a load resistor 103 switches on and off an infrared light-emitting diode 105 at an approximately 15 kilohertz rate. The infrared light-emitting diode 105 is optically coupled to the coupler 32 and thus to the optic cable 24. After passing across the machine feed track 18 the infrared light is received by the receiving fiber optic cable 23, and after passing through the coupler 31 the infrared light is sensed by a photo transistor 106. Current from the photo transistor 106 is converted to a voltage across the load resistor 107, nominally 10 k ohms, and fed to the tone decoder 95 by a high pass filter comprising a coupling capacitor 108, and a level setting potentiometer 109. The nominal value of capacitor 108 insures that the 15 kilohertz signal transmitted by the infrared diode 105 may be separated from noise components such as 60 hertz light from fluorescent lamps and also from any 60 hertz noise feeding through from the unregulated power supply on node 94. The tone decoder 95 compares the phase of the input frequency on pin 3 to the phase of the output frequency on pin 5 to generate a synchronously detected signal that is passed through a signal detection filter inside the integrated circuit 95 using external capacitors 110a and 110b. The integrated circuit 95 has an internal threshold detector generating a signal detect open collector output on pin 8 that is fed to a wired-OR node 111. An input 112 to the wired-OR circuit may be used for adding a secondary proximity switch and in fact the secondary proximity switch (not shown) could be used exclusively merely by removing the fiber optic cables 24 and 23 since then the tone decoder 95 output on pin 8 will always look like an open circuit. The wired-OR output is also sensed by an inverter generally designated 115 comprising a transistor 118, a turn on resistor 117 and a directional diode 116 cooperating together as a means for inverting the decoder output on pin 8 which indicates whether light from the source 105 reaches the sensor 106. The diode 116 is preferably a germanium diode and the transistor 118 is preferably a silicon transistor so that when the wired-OR node 111 is grounded then the transistor 115 will be turned off because a current from the turn on resistor 117, will flow through the germanium diode 116 rather than the base-emitter junction of the transistor 118. But the use of the diode 116 insures that when the wired-OR node 111 is not connected to ground it may rise up to the unregulated supply voltage on node 94 because then the diode 116 is reverse-biased preventing current flow from the wired-OR node 111 into the base of the transistor 118. A polarity selector switch generally designated 120 having a slide button 33 may be used to either select the wired-OR polarity or the inverse of the wired-OR polarity obtained from the inverter 115. Selectable polarity is useful for compensating for various polarities of auxiliary switches connected to the input 112 and also for using the vibratory controller 25 to control vibrator powered machine feed tracks 18 as well as vibratory feeders. The center terminal of the slide switch 120 is connected to an optical coupler 112 through a current limiting resistor 121. The optical coupler 122 couples the sensor detecting circuits 46 to the delay circuits 70 while maintaining a high degree of isolation. Unlike the sensor detection circuits 46, the time delay circuits 70 run off a regulated supply +Vs obtained on node 124 after regulation through an integrated circuit voltage regulator 123 typically part No. 7815.

The time delay circuits include an RTL inverter stage comprising transistor Q1, series resistor 51, threshold raising resistor 52, and a load resistor 53, cooperating together as a voltage driving means. The drive voltage Vd at the output node 77 is fed to the delay adjusting potentiometer 71 and is also connected to the directional diodes 74 and 75. The potentiometer 71 varies the resistance between the node 77 and the node 78 of the charging capacitor 72 and therefore sets the charging current. Node 78 is also connected to the center terminal of a double throw slide switch 73 having a center off terminal for shunting the potentiometer 71 either with directional diode 75 for an off delay or with directional diode 74 for an on delay or with neither for a dual delay in the center off position. The Schmitt trigger generally designated 76 is comprised of an operational amplifier 126 nominally part No. 741 connected with positive feedback through a series feedback resistor 127 and an equalizing potentiometer 128 shunting the positive input to ground. It should be noted that the thresholds 81, 82 shown in FIG. 7 are obtained with the operational amplifier 126 due to the fact that the output voltage Vo does not swing all the way up to supply +Vs or all the way down to ground, but rather swings to within approximately 1 volt of positive supply +Vs and to within about 1.5 volts of ground. The equalizing resistor 128 drops the thresholds 81, 82 slightly so that the average value of the thresholds is approximately ½ of +Vs thereby permitting adjustment of the potentiometer 128 so that the on delay Tdn is set equal to the off delay Tdf in the dual delay mode. The output of the operational amplifier 126 is fed directly to an optical coupler 129, with reliance on the short circuit protection of the operational amplifier 126 to limit the current to the input of the optical isolator 129. The optical isolator 129 is preferably formed by the connection of two light activated SCR's, although a similar function should be performed by a light activated triac. Test results, however, have indicated that using two light activated SCR's connected as shown gives better results than the light activated triac. These better results probably are due to superior transit switching ability of the two SCR's compared to a single triac.

The power control circuit generally designated 130 is the subject of a commonly assigned application of Robert F. Rose, entitled "Power Control for Vibratory Feeder" filed Jan. 9, 1981, Ser. No. 223855. The power control circuit 130 operates as a machine power control means, having an optical coupler input 129 receiving the control signal Vo from the Schmitt trigger 76, for controlling the power fed to the feed machine 11 in response to the input control signal Vo. Basically the feeder 11 is connected through its power input line 27 to the AC power line 26 through series switch 28 to node 145 and also connected to the return node 140 through a power control triac 132, part No. SC160D. The feeder 11 is shunted by a resistor 131 so that the triac 132 sees a minimum resistive load across the feeder 11. The triac is triggered by charge stored on a capacitor 133 when the voltage on the capacitor 133 exceeds the breakdown voltage of a diac 134, part No. ST-2. A bleeder resistor 135 is connected across the capacitor 133 to prevent excessive charge build-up when a diode 137 is used instead of a jumper 136 for providing 60 hertz operation of the feeder 11 instead of 120 hertz, respectively. The power control 29 connected to a potentiometer 139 in series with a minimum resistance setting resistor 141 determines the rate at which a charge storage capacitor 133 is charged and therefore determines the delay in the firing of the diac 134 and conduction of the triac 132 thereby adjusting the power level exciting the feeder 11. A phase delaying second time constant capacitor 142 is also used to provide more precise regulation of the triac 132 firing and power level fed to the vibratory feeder 11. The capacitor 142 is charged from the AC supply voltage across the hot node 145 with reference to the return node 140 through a charging resistor 143. This is in distinction to the direct charging path of capacitor 133 through the optical isolator 129, the power level setting potentiometer 139 having the control shaft 29, and the maximum power current limiting resistor 141, which charges the capacitor 133 with the AC voltage across the triac 132. The second capacitor 142 is connected to the first charging capacitor 143 via a variable resistor 144 which is used to set the zero power level of the power control 29. To protect the triac 132 and other components from excessive transients on the AC supply lines 26, a varistor 146 part No. GEV13-0LA10A is connected from the hot AC node 145 to the return node 140, and also a similar varistor 147 shunts the triac 132. A snubber network consisting of a resistor 148 in series with a capacitor 149 also shunts the triac 132 to further suppress transients and to limit the rate of rise of voltage across the triac 132.

What we claim is:

1. A machine control for controlling the power fed to a machine in response to a sensor signal comprising, machine power control means having an input receiving a control signal for controlling the power fed to the machine in response to the input control signal, and signal delay means, having an input receiving the sensor signal and an output fed to the input of the machine power control means, for generating a control signal responsive to the sensor signal after an approximately equal delay following both increasing and decreasing changes in the sensor signal, and further having a variable resistor and control means responsive to the resistance of the variable resistor for adjusting the delay following both increasing and decreasing changes in the sensor signal, so that individual variable resistances for setting the delay following increasing changes and for the delay following decreasing changes are not required and precise simultaneous adjustment of the variable resistors is not required for obtaining approximately equal delay following both increasing changes and decreasing changes in the sensor signal.

2. The combination as claimed in claim 1 wherein the signal delay means further comprises means for applying a voltage across the variable resistor having a polarity responsive to the sensor signal so that the direction of the current flowing through the variable resistor is responsive to the sensor signal, and a capacitor receiving a current in response to the current flowing through the variable resistor, and wherein the generated control signal is generated in response to the voltage across the capacitor, so that adjustment of the variable resistor provides a controlled variation in delay for both increases and decreases in the sensor signal.

3. A feedback control system for starting and stopping a feed mechanism supplying a temporary storage receiving means comprising, in combination, sensor means generating a binary sensor signal for indicating whether the quantity temporarily stored exceeds a predetermined threshold, power control means having an input receiving a binary control signal for starting and stopping the feed mechanism in response to the control signal, and delay means having an input receiving the binary sensor signal for generating the binary control signal in response to the sensor signal after delay following both low-to-high and high-to-low transitions of the binary control signal, the delay means also including a single control responsive to operator manipulation and delay control means responsive to the single control for changing the delay following both the low-to-high and high-to-low transitions of the binary control signal with the proportionate change in the delay following low-to-high transitions being approximately equal to the proportionate change in the delay following high-to-low transitions, so that the operator may use a single control to adjust the delay following both high-to-low and low-to-high transitions in the binary sensor signal and thus adjust the amplitude of fluctuations of quantity temporarily stored above and below the predetermined threshold.

4. The combination as claimed in claim 3 wherein the delay means comprises, in combination, voltage driving means for generating a binary drive voltage in response to the binary sensor signal in which the drive voltage assumes either of a first drive voltage level or a second drive voltage level, bi-directional variable resistor means having first and second terminals and having a resistance between the first and second terminals responsive to the single control, the first terminal accepting the binary drive voltage, for generating a charging current in a reference direction in response to the first drive voltage and a discharging current in the opposite of the reference direction in response to the second drive voltage, the resistance being varied by the delay control means, capacitor means connected to the second terminal of the variable resistor means for generating a capacitor voltage apparoximately proportional to the integral of the charging current so that the capacitor voltage swings between a maximum and minimum capacitor voltage level in response to the charging current, and threshold detector means, receiving the capacitor voltage and having a predetermined threshold between the maximum and minimum capacitor voltage levels and a binary decision output, for comparing the capacitor voltage to the predetermined threshold to generate the binary control signal on the binary decision output, so that the delay control means adjusts both the charging current and the discharging current thereby adjusting the time delay from sensor signal transitions to corresponding binary control signal transitions following both the low-to-high and high-to-low transitions.

5. The combination as claimed in claim 4 wherein, the threshold means includes a Schmitt trigger having first and second thresholds, the spacing between the first and second thresholds being a substantial fraction of the spacing between the maximum and minimum capacitor voltage levels, so that the rate at which the binary control signal changes logic state is bounded to a minimum value, regardless of the rate at which sensor signal transitions occur, thereby suppressing noise on the sensor signal.

6. The combination as claimed in claim 4 wherein bi-directional variable resistor means is a variable resistor and the single control means is a knob mechanically connected to the variable resistor.

7. The combination as claimed in claim 4 wherein, the delay means further comprises a directional diode and a switch in series, shunting the variable resistor means so that the resistance of the variable resistor means is selectably dependent upon resistor means current direction, thereby permitting delay times for delays following sensor signal high-to-low transitions to be selectably different than the delay times following low-to-high transitions and thus permitting fluctuations in temporarily stored quantity above the predetermined threshold to be different from fluctuations in temporarily stored quantity below the predetermined threshold.

8. A vibratory feeder control for controlling the excitation of a vibratory parts feeder having an exciting electromagnet, a parts bowl, a machine feed track receiving parts fed from the parts bowl, and a parts detection sensor having an electrical output indicating the backlog of parts in the machine feed track, comprising, in combination,
  bi-directional charging means for generating a bi-directional charging signal having a polarity responsive to the electrical output of the parts detection sensor and having a magnitude generally independent of said charging signal polarity, said charging means further having a manually adjustable control generally controlling the magnitude of the charging signal,
  integrating means for generating an integrated output generally proportional to the integral of the charging signal,
  threshold means, receiving the integrated output and having a predetermined threshold and a binary decision output, for comparing the integrated output to the predetermined threshold and generating a binary signal at the binary decision output responsive to the comparison, and
  power control means, responsive to the binary signal at the decision output of the threshold means, for modulating the excitation to the electromagnet, so that the excitation of the vibratory parts feeder is responsive to both the presence and absence of parts fed to the machine feed track after a generally equal delay time set by the manually adjustable control.

9. The combination as claimed in claim 8 wherein, the parts detection sensor generates a binary sensor output signal indicating the presence of individual parts passing through the machine feed track,
  wherein the integrated output of the integrating means is limited to fall between a maximum charge value and a minimum charge value, and
  the threshold means includes a Schmitt trigger having first and second thresholds within the maximum and minimum charging values, with the spacing between the first and second thresholds being a substantial fraction of the spacing between the maximum and minimum charging values, and the Schmitt trigger output being connected to the binary decision output, so that the rate at which the binary decision output changes logic state is limited to a minimum value regardless of the rate at which the binary control signal changes logic state, so that the pulses in the binary sensor output signal due to the passage of individual parts, even though there is no backlog of parts, are rejected.

10. The combination as claimed in claim 8 wherein the bi-directional charging means includes a variable resistor and the resistance of the variable resistor is adjusted by the manual control.

11. The combination as claimed in claim 10 wherein the bi-directional charging means further comprises
  a switch having a least three positions, and
  at least one directional diode, the diode and switch being electrically connected to the variable resistor, with the variable resistor being directionally shunted in a first direction by a diode when the switch is in first position, the variable resistor not being appreciably directionally shunted by a diode when the switch is in a second position, and the variable resistor being directionally shunted in a direction opposite to the first direction when the switch is in a third position, so that when the switch is in the second position the excitation of the vibratory parts feeder is responsive to both the presence and absence of parts fed to the machine feed track after said generally equal delay time set by the manually adjustable control, when the switch is in another of said three positions the excitation of the vibratory parts feeder is responsive to the presence of parts fed to the machine feed track after said generally equal delay time and is responsive to the absence of parts fed to the machine feed track without substantial delay, and when the switch is in yet another of the three positions the excitation of the vibratory parts feeder is responsive to the absence of parts fed to the machine feed track after said generally equal delay time and is responsive to the presence of parts fed to the machine feed track without substantial delay.

12. The combination as claimed in claim 10 wherein the integrating means includes a capacitor, the current received by the capacitor is proportional to the charging current and the integrated output is responsive to the voltage across the capacitor.

13. A self-contained multi-mode vibratory feeder control for controlling the excitation of a vibratory parts feeder having an exciting electromagnet, a parts bowl, and a machine feed track receiving parts fed from the feeder bowl and having a parts detection point, comprising, in combination:
  fiber-optic transmission means having an optical path including the parts detection point of the machine feed track for sensing the presence of parts in the machine feed track; and
  a self-contained power control unit physically separated from the machine feed track and including, in combination,
    a sensor circuit having a light source and a light sensor optically coupled to the fiber-optic transmission means and generating a binary logic signal indicating whether light from the source reaches the light sensor, and
    a delay circuit having an input receiving the binary logic signal from the sensor circuit and generating a binary power control signal responsive to the binary logic signal after a time delay approximately independent of the direction of change of the binary logic signal, the delay circuit further having a control adjusting the time delay after both the low-to-high and the high-to-low changes in logic state of the binary logical signal, and a power control circuit having an input receiving the power control signal and having an AC power input line and AC power output line connected to the exciting electromagnet of the vibratory feeder, wherein power from the AC power input lines is transferred to the AC power output lines in response to the power control signal, and further having a power adjustment control for scaling the magnitude of power transferred, so that the only signal connection between the self-contained power control unit and the vibratory parts feeder is the fiber-optic transmission means so that the operation of the feeder control is immune from electromagnetic interference.

14. The combination as claimed in claim 13, wherein the delay circuit has a switching means for selectively making the time delay dependent on direction of change of the binary logic signal.

15. The combination as claimed in claim 14, further comprising an inverter means for changing the polarity of the binary logic signal, and a polarity selecting switch for selecting either the polarity of the binary logic signal received by the inverter means or the polarity of the binary logic signal generated by the inverter means and transmitting the selected polarity binary logic signal to the delay circuit means, so that the vibratory feeder control may easily control vibratory powered machine feed tracks as well as vibratory feeders.

* * * * *